(12) United States Patent
Kim et al.

(10) Patent No.: US 7,048,219 B2
(45) Date of Patent: May 23, 2006

(54) REEL CLUTCH OF A TAPE RECORDER

(75) Inventors: Bong-joo Kim, Suwon (KR);
Hyeong-seok Choi, Suwon (KR);
Jae-Kab Seo, Suwon (KR); Jun-young Kim, Suwon (KR); Byeong-bae Park, Ansan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/670,418

(22) Filed: Sep. 26, 2003

(65) Prior Publication Data

US 2004/0069887 A1  Apr. 15, 2004

(30) Foreign Application Priority Data

Oct. 10, 2002 (KR) .................. 10-2002-0061821
Nov. 7, 2002 (KR) .................. 10-2002-0068836
Nov. 18, 2002 (KR) .................. 10-2002-0071728
Jan. 17, 2003 (KR) .................. 10-2003-0003426

(51) Int. Cl.
*G11B 15/44* (2006.01)
*G11B 15/32* (2006.01)
*G11B 15/08* (2006.01)

(52) U.S. Cl. ............... 242/340; 242/344; 242/356.3

(58) Field of Classification Search ............ 242/333.7, 242/340, 344, 349, 356, 356.3, 356.5, 357; 360/85, 96.3; 267/161; 192/48.9, 55.1
See application file for complete search history.

(56) References Cited

U.S. PATENT DOCUMENTS

| | | | |
|---|---|---|---|
| 3,913,868 A * | 10/1975 | Katahira et al. | 242/356.5 |
| 3,921,220 A * | 11/1975 | Primosch et al. | 360/72.3 |
| 4,234,140 A | 11/1980 | Van Nie et al. | |
| 4,480,881 A | 11/1984 | Fujimor | |
| 4,494,712 A * | 1/1985 | Godwin et al. | 242/333.7 |
| 4,917,328 A * | 4/1990 | Kobayashi et al. | 242/355 |
| 5,573,197 A | 11/1996 | Choi | |
| 5,617,336 A * | 4/1997 | Lee | 702/127 |
| 5,639,042 A * | 6/1997 | Chiu et al. | 242/354 |
| 5,758,839 A | 6/1998 | Kim | |
| 6,042,038 A | 3/2000 | Shiraishi | |
| 6,050,515 A * | 4/2000 | Shinohara et al. | 242/356.5 |
| 6,581,867 B1 * | 6/2003 | Seo et al. | 242/355 |
| 2002/0070304 A1 | 6/2002 | Chae et al. | |

FOREIGN PATENT DOCUMENTS

GB  2 307 777 A  6/1997

* cited by examiner

*Primary Examiner*—Kathy Matecki
*Assistant Examiner*—Scott Haugland
(74) *Attorney, Agent, or Firm*—Roylance Abrams Berdo & Goodman LLP (57) ABSTRACT

Disclosed is a reel clutch of a tape recorder. A plate spring is positioned between a reel gear and a reel disc of a reel disc assembly which is mounted on a deck of a tape recorder, and a stopper reel is provided on the reel disc to restrain the engaging height of the plate spring so that a torque is generated by the frictional contact between the reel disc and the plate spring, whereby assembly productivity can be enhanced and manufacturing costs can be reduced.

6 Claims, 6 Drawing Sheets

REEL CLUTCH OF A TAPE RECORDER

FOREIGN PRIORITY INFORMATION

This application claims priority under 35 U.S.C. § 119 to a Korean Patent Application, Serial No. 2002-61821, filed in the Korean Intellectual Property Office on Oct. 10, 2002, to Korean Patent Application Serial No. 2002-68836, filed in the Korean Intellectual Property Office on Nov. 7, 2002, to Korean Patent Application Serial No. 2002-71728, filed in the Korean Intellectual Property Office on Nov. 18, 2002, and to Korean Patent Application Serial No. 2003-3426, filed in the Korean Intellectual Property Office on Jan. 17, 2003, the contents of all four said applications being incorporated herein by reference

BACKGROUND OF THE INVENTION

1. Field of the Invention

The present invention relates to a magnetic recording/reproducing apparatus, and more particularly, to a reel apparatus for driving a tape cassette of a magnetic recording/reproducing apparatus.

2. Description of the Related Art

Generally, a magnetic recording/reproducing apparatus records information on a recording medium such as a magnetic tape, and also reproduces the recorded information from the recording medium. Examples of such magnetic recording/reproducing apparatuses mainly include video tape cassette recorders (VCR) and camcorders.

Figure 1:
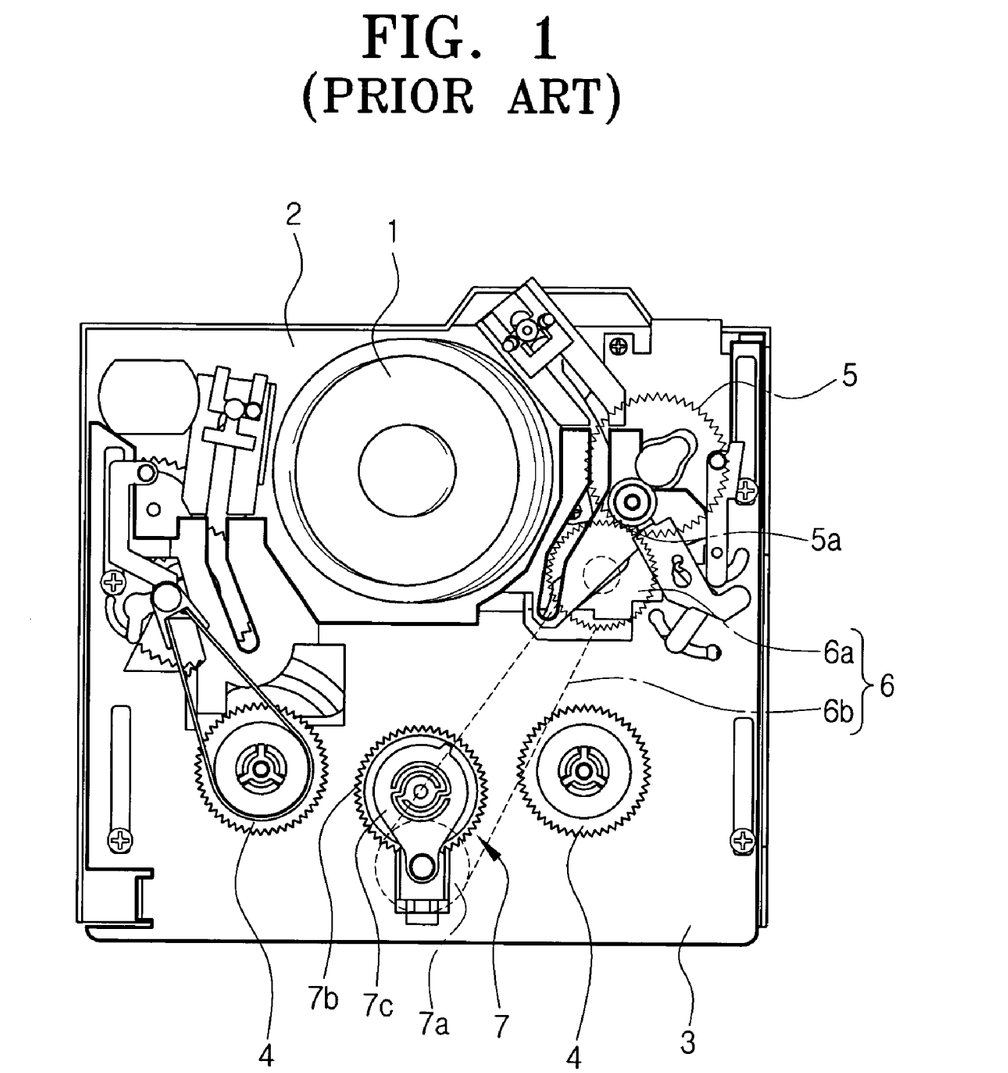
FIG. 1 is a schematic plan view illustrating a conventional magnetic recording/reproducing apparatus.

Referring to FIG. 1, a conventional magnetic recording/reproducing apparatus includes a main deck 2 on which a head drum 1 is rotatably mounted; a sub deck 3, which can be loaded/unloaded with respect to the main deck 2; a pair of reel assemblies 4, which are rotatable with respect to the sub deck 3 and drive the tape reel of the tape cassette; a reel assembly driving apparatus 7, which receives the driving force from a capstan motor 5 at the main deck 1 and selectively transmits the received driving force to the pair of reel assemblies 4; and a driving force transmitting unit 6, which transmits the driving force from the capstan motor 5 to the reel assembly driving apparatus 7.

The reel assemblies 4 include a supply part reel table (left-hand side of FIG. 1) to supply magnetic tape from the tape cassette, and a take-up part reel table (right-hand side of FIG. 1) to wind the magnetic tape as fed.

The driving force transmitting unit 6 includes a capstan gear 6a, driven in association with an axis gear 5a of the capstan motor 5, and a timing belt 6b, to transmit the driving force from the capstan gear 61a to the reel assembly driving apparatus 7.

The reel assembly driving apparatus 7 includes a pulley gear unit 7a, which is connected with a timing belt 6b, an idle gear 7b driven in association with the pulley gear unit 7a, and a pivoting plate 7c connecting the pulley gear unit 7a to the idle gear 7b.

Figure 2:
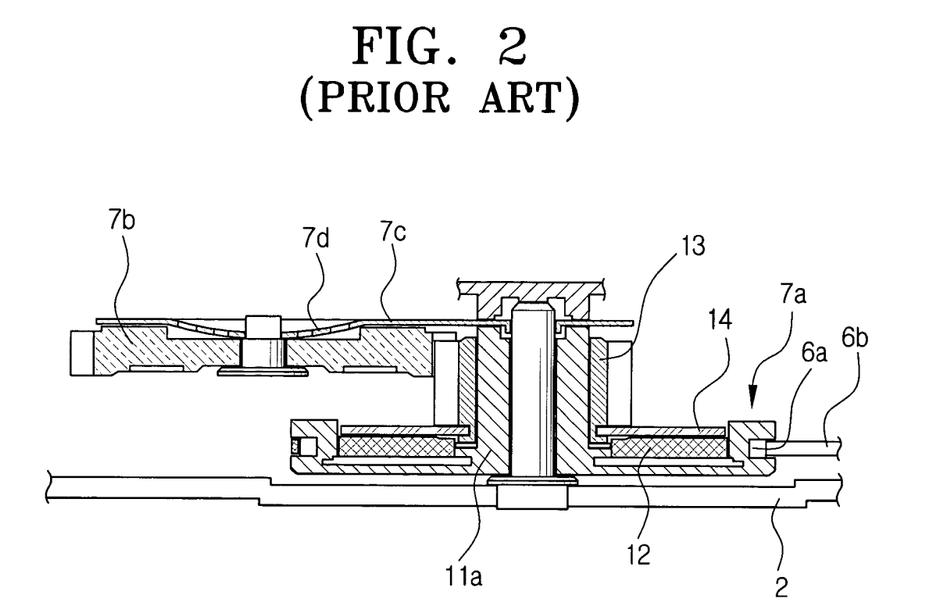
FIG. 2 is a sectional view illustrating the reel assembly driving apparatus of FIG. 1.

As shown in FIG. 2, the pivoting plate 7c may have an elastic part 7d which is cut in a predetermined pattern in the central portion of the pivoting plate 7c so as to function as a plate spring. Because the elastic part 7d is contacted with the idle gear 7b with a predetermined frictional force, when the idle gear 7b shifts the direction of its rotation, the pivoting plate 7c is subjected to a torque which causes the pivoting plate 7c to pivot. Accordingly, the idle gear 7b can be selectively connected to the left and right reel assemblies 4.

In the above-described construction, a part of rotational force of the pulley gear 11 is transmitted to a clutch gear 13 by the magnetic force generated between a magnet 12 and a metal piece 14. Since the rotational force can be reduced as the force is transmitted via the idle gear 7b to the destined reel assembly 4, the tape reel of the tape cassette can be rotated with the correct force.

However, in the conventional magnetic recording/reproducing apparatus constructed as above, because some components are required to provide a predetermined frictional force to the idle gear 7b to pivot the pivoting plate 7c, the overall construction becomes complicated. Further, as additional components are also required to control the torque to the tape cassette reel, the construction of the magnetic recording/reproducing apparatus becomes still more complicated. Also, because the price of the magnet employed in the conventional magnetic recording/reproducing apparatus is usually high, the manufacturing costs increase.

Alternatively, a frictional force generator, i.e., a torque generator as provided to the pulley gear unit 7a, can also be provided to the pair of reel assemblies 4 as a substitute. However, the problem is that this substitute also requires expensive components of rather complicated structure.

SUMMARY OF THE INVENTION

Accordingly, it is an aspect of an embodiment of the present invention to provide a reel assembly driving apparatus and a reel assembly of a magnetic recording/reproducing apparatus, which is improved to have a simple construction.

In order to achieve the above aspect, the preferred embodiment of the present invention provides a reel clutch of a tape recorder, which is installed in a reel disc assembly mounted on a deck of a tape recorder and having a reel gear and a reel disc, for generating a torque to adjust the tension of a magnetic tape, thereby controlling the running speed of the magnetic tape. the reel clutch comprises a plate spring positioned between the reel gear and the reel disc; and a stopper reel engaged with the reel disc to restrain the engaging height of the plate spring, so that the reel disc and the plate spring come into contact with each other to generate a torque by friction.

In the reel clutch having the above-described construction according to an embodiment of the present invention, the bottom surface of the reel disc is preferably provided with serrations which are formed to be capable of coming into frictional contact with the plate spring.

In addition, it is preferable that the plate spring comprises a plate body which is formed with one or more slits in a predetermined pattern, so that the plate spring is elastically freely movable by an external pressure.

Furthermore, it is preferable that a lubricant is interposed between the reel disc and the plate spring.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE PREFERRED EMBODIMENTS

A reel assembly and a reel assembly driving apparatus of the magnetic recording/reproducing apparatus according to an embodiment of the present invention will now be described in greater detail with reference to the accompanying drawings and the preferred embodiments of the present invention.

Figure 3:
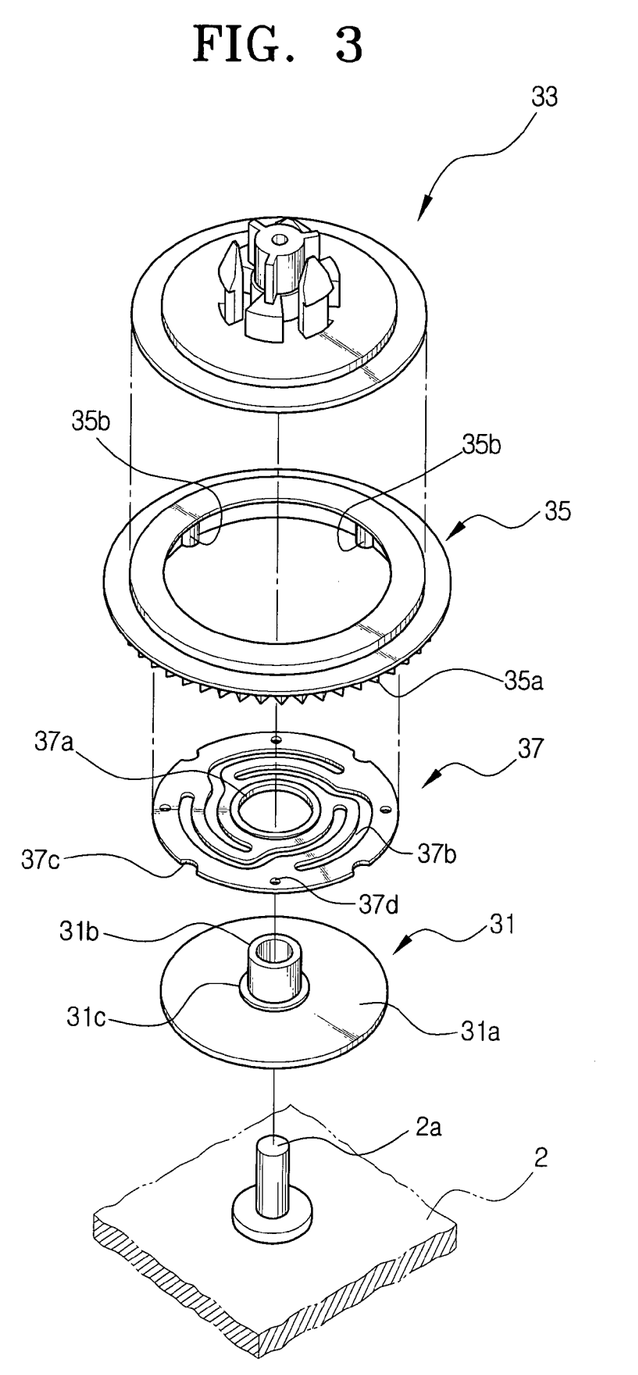
FIG. 3 is a perspective view illustrating an assembly of a magnetic recording/reproducing apparatus according to a preferred embodiment of the present invention before assembling.
Figure 4:
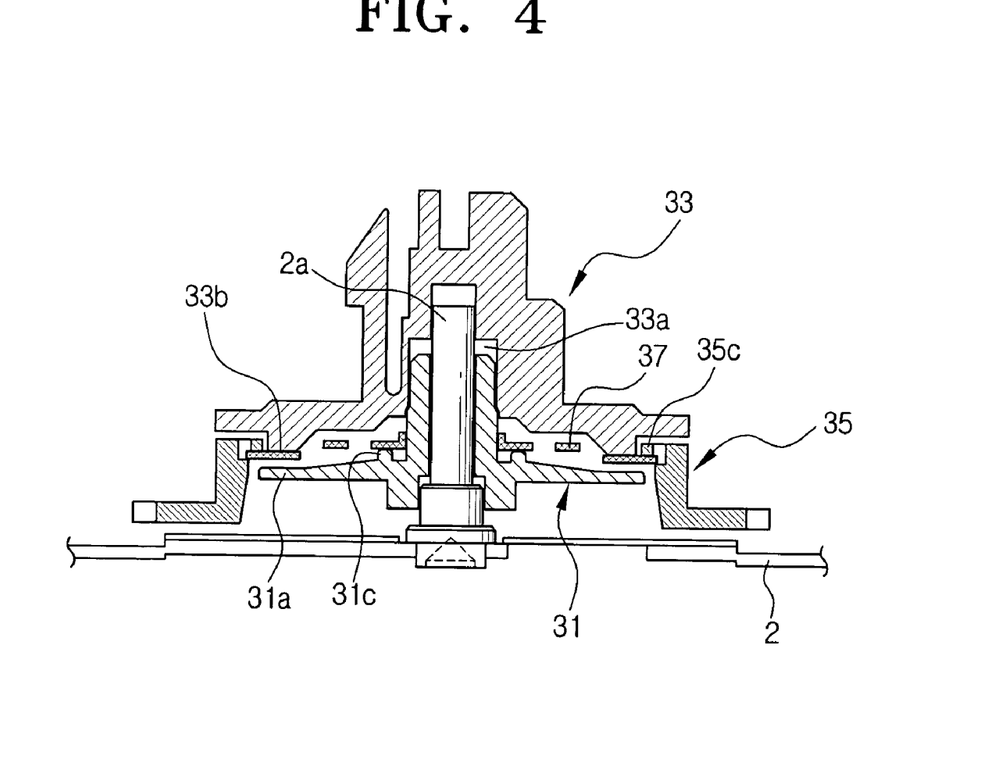
FIG. 4 is a sectional view illustrating the assembly of the magnetic recording/reproducing apparatus according to the preferred embodiment of the present invention after assembling.

Referring to FIGS. 3 and 4, the reel assembly of the magnetic recording/reproducing apparatus according to one preferred embodiment of the present invention includes a lower reel 31 rotatable with respect to a stationed axis 2a at the main deck 2, an upper reel 33 (or reel disc) joined with the upper portion of the lower reel 31 (or stopper reel), and a clutch member 37 disposed between the lower and upper reels 31, 33.

The lower reel 31 has an axis portion 31b protruding from the center of a circular body 31a to a predetermined height. The stationed axis 2a is fit with respect to the axis portion 31b. Around the lower portion of the axis portion 31b and on the upper surface of the circular body 31a is formed a protruding part 31c formed with a predetermined height. There is formed an axis hole 33a in the lower surface of the upper reel 33 so that the axis portion 31b is inserted in the axis hole 33a of the upper reel 33 to a predetermined depth. The axis portion 31b is force-fit in the axis hole 33a so as to cause a frictional force with the axis hole 33a. Accordingly, the upper and lower reels 31, 33 are rotated altogether.

Figure 5:
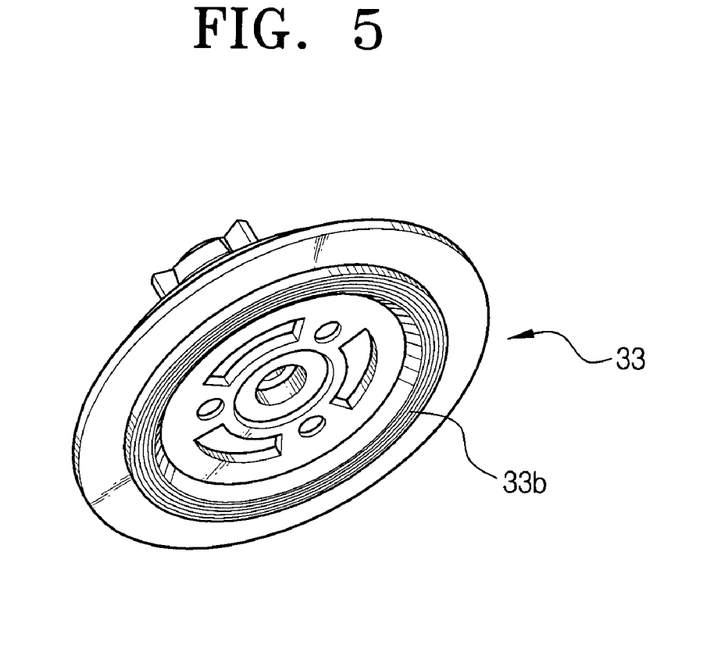
FIG. 5 is a perspective view illustrating an upper reel of FIG. 3.

The upper portion of the upper reel 33 is protruded in a predetermined shape so that the tape reel of the tape cassette is securely seated thereon. Around the lower surface of the upper reel 33, there is formed an annular rib 33b which is protruded to elastically urge the outer rim of the clutch member 37 downward. Also, as shown in FIG. 5, a serration is formed on the surface of the rib 33b with a predetermined roughness. The serration is formed along the surface of the rib 33b in an annular fashion.

The reel gear 35 is disposed between the upper and lower reels 31, 33. The reel gear 35 has an annular shape, and is provided with gear teeth 35a formed along the outer circumference. The gear teeth 35a are selectively connected to the idle gear 7b (FIG. 1) of the driving apparatus which is driven by the driving force from the capstan motor 5 to receive the driving force. The clutch member 37 is fit in the reel gear 35, and in order to secure the clutch member 37 in position, there are locking protrusions 35b formed along the inner circumference of the reel gear 35. The locking protrusions 35b are elongated in the direction along which the clutch member 37 is fit into the reel gear 35, and also provided at regular intervals. The reel gear 35 is connected to the upper and lower reels 31, 33 by the intervention of the clutch member 37. In other words, the reel gear 35 is connected such that the reel gear 35 is not directly contacted with the upper and lower reels 31, 33.

The clutch member 37 functions to reduce the rotational force of the reel gear 35 and transmit the reduced rotational force to the upper and lower reels 31, 33. It is preferable that the clutch member 37 is a plate spring. There is an axis hole 37a into which the axis portion 31b is inserted. The clutch member 37 also has slits 37b which are cut in a predetermined fashion to enable the clutch member 37 to elastically move in the vertical direction freely by the external force. The clutch member 37 also has a plurality of locking holes 37c formed in the outer circumference to correspond to the locking protrusions 35b. The clutch member 37 also has a plurality of fitting holes 37d to fit with hooks 35c of the reel gear 35. The clutch member 37 supported on the reel gear 35 is contacted with, and thus supported by, the upper and lower reels 31, 33, respectively.

The center of the clutch member 37 is contacted with the protruding part 31c of the lower reel 31 and thus elastically urged upward. The outer rim of the clutch member 37 is elastically urged downward by the contact with the rib 33b of the upper reel 33. Due to the contact between the clutch member 37 and the upper and lower reels 31, 33, the rotational force of the reel gear 35 is transmitted to the upper and lower reels 31, 33. Here, the rotational force is not entirely transmitted to the upper and lower reels 31, 33, but transmitted in a reduced degree in accordance with the degree of frictional force which is caused by the clutch member 37.

Preferably, a lubricant (not shown) is applied between the upper reel 33 and the clutch member 37. More preferably, the lubricant (not shown) is applied to the lower surface of the upper reel 33 and the upper surface of the clutch member 37 at the point where the annular ribs 33b contact the outer rim of the clutch member 37.

In the reel assembly of the magnetic recording/reproducing apparatus constructed as above according to the first preferred embodiment of the present invention, the elastic clutch member 37 is firmly secured to the reel gear 35 and does not sway or move. Further, because the clutch member 37 is positioned at an accurate height by the support of the upper and lower reels 31, 33, the resiliency of the clutch member 37 seldom varies, and therefore, the frictional force with the neighboring components can be maintained substantially constant. As a result, the driving force from the reel gear 35 to the upper and lower reels 31, 33 can be maintained to a substantially constant degree. Additionally, because the reel assembly has a simple structure and does not require an expensive magnet, manufacturing costs can be reduced.

Figure 6:
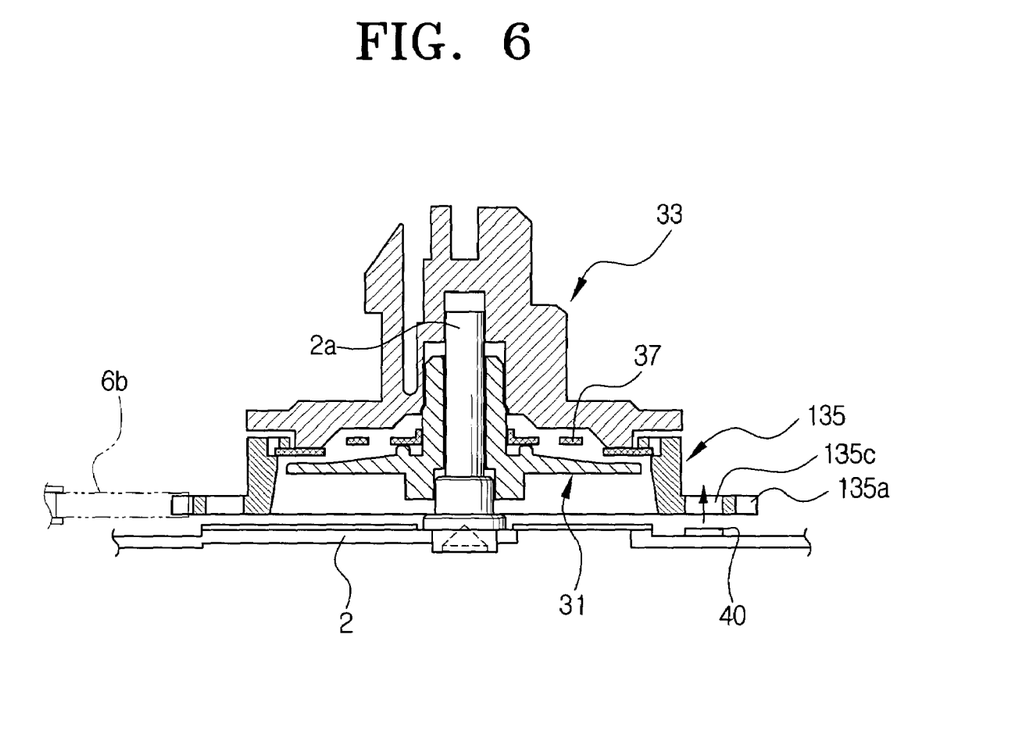
FIG. 6 is a sectional view illustrating a reel assembly according to another preferred embodiment of the present invention.
Figure 7:
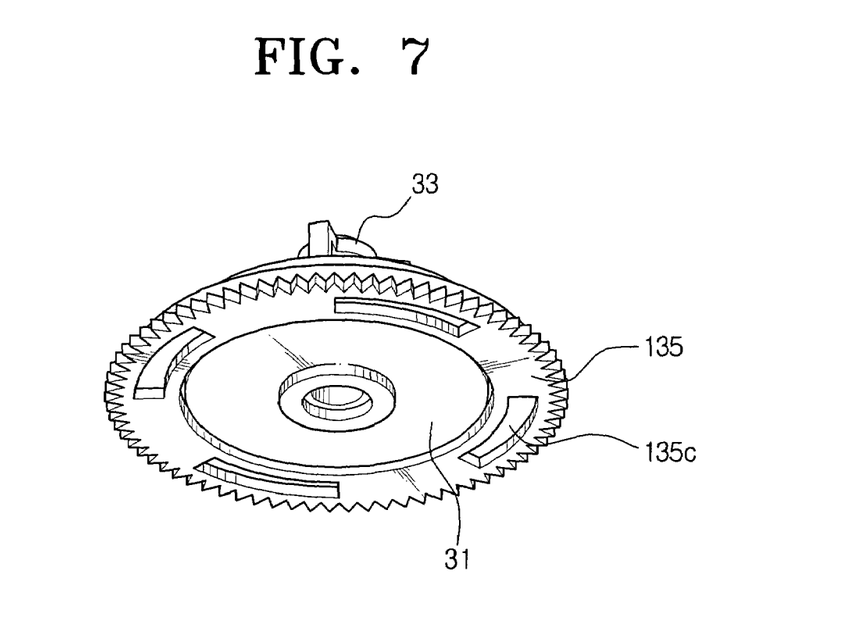
FIG. 7 is a perspective view of the reel gear of FIG. 6.

Referring now to FIGS. 6 and 7, a reel assembly of a magnetic recording/reproducing apparatus according to a second preferred embodiment of the present invention will be described. Throughout the description, like elements will be given the same reference numerals of FIGS. 3 to 5.

Shown in FIGS. 6 and 7, there is a sensor, i.e., a light receiving/emitting sensor 40, to sense the rotational status of the reel gear 135 with respect to the sub deck 3. As described above, the reel gear 135 has gear teeth 125a which are engaged with the idle gear 7b (FIG. 1) of the reel assembly driving apparatus. The driving force, which is transmitted to the reel gear 135 via the idle gear 7b, generates a torque with the intervention of the clutch member 37 so as to cause the upper reel 33 to rotate at a predetermined speed.

Meanwhile, the reel gear 135 has a plurality of sensing holes 135c formed in the direction of rotation. The sensing holes 135c are pierced so that the light from the light receiving/emitting sensor 40 can pass therethrough. As shown in FIG. 7, the sensing holes 135c are formed at equal intervals in the direction of rotation of the reel gear 135.

In the above-mentioned construction, the light receiving/emitting sensor 40 emits a light toward the reel gear 135, and also receives the light reflected from the reel gear 135 so as to sense the rotational status and the speed of the reel gear 135. Because the light is reflected from the reel gear 135 except where the sensing holes 135c occur, the light receiving/emitting sensor 40 can determine the rotational status of the reel gear 135 through repetitive reception and non-reception of the light reflected from the reel gear 135. When the reel gear 135 is not rotated, the light receiving/emitting sensor 40 may successively receive the light or may not receive the light at all, thus recognizing that the reel gear 135 is not rotating. The reel gear 135 is preferably made of white material which can reflect the light effectively, although other colors can also be adequately used.

With the reel assembly described as above, the reel assembly can be constructed without requiring additional components, by simply attaching a reflective film to some parts of the reel gear 135 to reflect the light, or by forming the sensing holes 135c instead of attaching additional light absorbent material.

Figure 8:
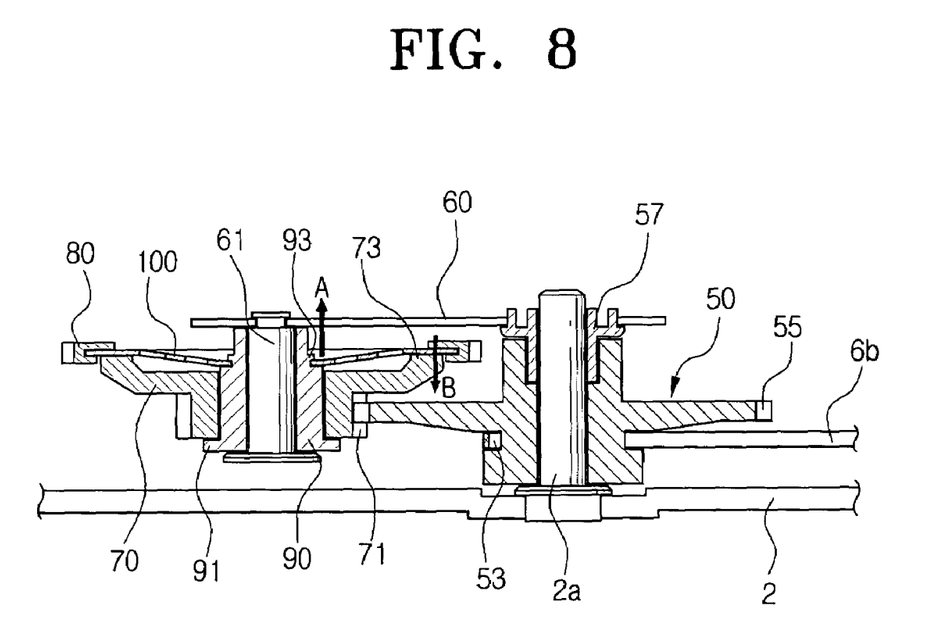
FIG. 8 is a sectional view illustrating a reel assembly driving apparatus of a magnetic recording/reproducing apparatus according to yet another preferred embodiment of the present invention.

Referring to FIG. 8, the reel assembly driving apparatus according to a third preferred embodiment of the present invention will be described. As shown in FIG. 8, the reel assembly driving apparatus includes a main gear 50 which is rotatable with respect to the main deck 2, a rotating lever 60 which is rotatable with respect to the upper portion of the main gear 50, an idle gear 70 engaged with the main gear 50, a clutch gear 80 arranged coaxially with the idle gear 70, a rotating body 90 rotatably supported on the rotating lever 60, and an elastic clutch member 100.

The main gear 50 is rotatably supported on the stationed axis 2a of the main deck 2 so as to be rotated by the driving force transmitted from the capstan motor 5 (FIG. 1). A pulley part 53, being connected with the timing belt 6b, is provided to the lower end of the main gear 50. Gear part 55 is engaged with the idle gear 70 to the upper portion of the pulley part 53. There is a clamper 57 at the upper portion of the axis 2a to prevent the main gear 50 from separating from the axis 2a.

One end of the rotating lever 60 is supported by the damper 57, while there is a fixed axis 61 formed at the other end of the rotating lever 60. The fixed axis 61 is provided at the lower portion of the rotating lever 60. As shown in FIG. 1, the rotating lever 60 is rotated to selectively connect to the pair of reel assemblies 4. The rotating force of the rotating lever 60 is transmitted from the main gear 50 to the idle gear 70, the clutch member 100 and the rotating body 90, respectively. When there is a frictional force between the rotating body 90 and the rotating lever 60, the rotating torque is generated at the rotating lever 60 to cause the rotating lever 60 to rotate.

The idle gear 70 has a gear part 71 which is engaged with the main gear 50. The idle gear 70 is rotatably engaged with the outer circumference of the rotating body 90. The idle gear 70 has an upper flange 73 which exclusively presses the outer rim of the clutch member 100 by the contact while being secured in a movement restriction protrusion 91 formed on the lower end of the rotating body 90. Due to the friction between the upper flange 73 and the contacting area of the clutch member 100, a torque is generated, and the clutch gear 80 is rotated by the generated torque.

The clutch gear 80 is engaged to one of the pair of reel assemblies 4 to transmit the driving force. The clutch gear 80 is secured to the outer side of the clutch member 100.

The rotating body 90 is rotatable with respect to the fixed axis 61, and is supported such that the rotating body 90 can be moved vertically. The rotating body 90 also has a locking groove 93 into which the clutch member 100 is securely fit in with the inner circle. The rotating body 90 is subjected to a force in the 'A' direction due to the elastic recovery force of the clutch member 100, and thus, urged to maintain a contact with the rotating lever 60 at an upper part with a predetermined friction. The rotating body 90 is integrally rotated with the clutch member 100.

Clutch member 100 is provided to adjust the rotational speed of the reel assemblies 4 by preventing direct transmission of the driving force from the main gear 50 to the reel assemblies 4 without any adjustments. The clutch member 100 functions to reduce the driving force from the main gear 50 before transmitting it to the reel assemblies. It is preferable that the clutch member 100 is a plate spring which is deformable and recoverable. The clutch member 100 is secured at its outer part to the clutch gear 80, and more preferably, the clutch member 100 is integrally secured to the clutch gear 80 by an insert molding. The center of the clutch member 100 is securely locked in the locking groove 93 of the rotating body 90. As the clutch member 100 is pressed toward the idle gear 73, the rim of the clutch member 100 is subjected to the elastic recovery force in the 'B' direction, while the center of the clutch member 100 is subjected to the elastic recovery force in the 'A' direction. As a result, at the contact area between the clutch member 100 and the idle gear 70, a 'clutching effect' can be obtained. In other words, the driving force is decreasingly adjusted before being transmitted. Further, due to the elastic recovery force in the 'A' direction, the rotating body 90 and the rotating lever 60 are integrally rotated with respect to the main gear 50.

In the reel assembly driving apparatus according to the present invention as described above, a single clutch member 100, i.e., a single plate spring, not only serves as a clutch to adjust the driving force which is transmitted from the main gear 50, to the reel assemblies 4, but also serves as a torque generator which enables the rotating lever 60 to shift the rotating direction. Accordingly, expensive component such as a magnet can be omitted, and two torques can be obtained in the same area. As a result, as the number of necessary parts decreases, and the assembling process is simplified, manufacturing costs can be greatly reduced.

While a few preferred embodiments of the present invention has been shown and described with reference to the preferred embodiments thereof, the present invention is not limited to those embodiments. It will be understood by those skilled in the art that various modifications and changes in form and details may be made therein without departing from the spirit and scope of the invention as defined by the appended claims.

What is claimed is:

1. A reel clutch of a tape recorder, which is installed in a reel disc assembly mounted on a deck of a tape recorder and having a reel gear and a reel disc, for generating a torque to adjust the tension of a magnetic tape, thereby controlling the running speed of the magnetic tape, wherein the reel clutch comprises:

a plate spring positioned between the reel gear and the reel disc; and a stopper reel engaged with the reel disc to restrain the engaging height of the plate spring, so that the reel disc and the plate spring come into contact with each other to generate a torque by friction, the bottom surface of the reel disc being provided with serrations which are formed to be capable of coming into frictional contact with the plate spring.

2. A reel clutch of a tape recorder which is installed in a reel disc assembly mounted on a deck of a tape recorder and having a reel gear and a reel disc, for generating a torque to adjust the tension of a magnetic tape, thereby controlling the running speed of the magnetic tape, wherein the reel clutch comprises:

a plate spring positioned between the reel gear and the reel disc;

a stopper reel engaged with the reel disc to restrain the engaging height of the plate spring, so that the reel disc and the plate spring come into contact with each other to generate a torque by friction; and a light receiver/emitter sensor, wherein the reel gear has a plurality of sensing holes formed in the direction of rotation.

3. The reel clutch according to claim 2, wherein:

the light receiver/emitter sensor is adapted to emit light toward the reel gear, and detect light that reflects from a surface of the reel gear and detect that light has not been reflected from the surface of the reel gear, when the light has passed through one or more of the plurality of sensing holes.

4. A reel clutch of a tape recorder, which is installed in a reel disc assembly mounted on a deck of a tape recorder and having a reel gear with a plurality of gear teeth formed along an outer circumference and a reel disc, for generating a torque to adjust the tension of a magnetic tape, thereby controlling the running speed of the magnetic tape, wherein the reel clutch comprises:

a plate spring positioned between the reel gear and the reel disc, the plate spring having a central portion and an outer rim;

a stopper reel engaged with the reel disc, the stopper reel urging the central portion of the plate spring upward, so that the reel disc and the outer rim of the plate spring come into contact with each other to generate a torque by friction; and a serrated annular rib formed on the lower surface of the reel disc to contact the outer rim of the plate spring.

5. A reel clutch of a tape recorder, which is installed in a reel disc assembly mounted on a deck of a tape recorder and having a reel gear and a reel disc, for generating a torque to adjust the tension of a magnetic tape, thereby controlling the running speed of the magnetic tape, wherein the reel clutch comprises:

a plate spring positioned between the reel gear and the reel disc, the plate spring having a central portion and an outer rim, the plate spring being fit into the reel gear and secured into an inner circumference of the reel gear by a plurality of locking protrusions formed on the inner circumference of the reel gear; and a stopper reel engaged with the reel disc, the stopper reel urging the central portion of the plate spring upward, so that the reel disc and the outer rim of the plate spring come into contact with each other to generate a torque by friction.

6. A reel clutch of a tape recorder, which is installed in a reel disc assembly mounted on a deck of a tape recorder and having a reel gear and a reel disc, for generating a torque to adjust the tension of a magnetic tape, thereby controlling the running speed of the magnetic tape, wherein the reel clutch comprises:

a plate spring positioned between the reel gear and the reel disc, the plate spring having a central portion and an outer rim;

a stopper reel engaged with the reel disc, the stopper reel urging the central portion of the plate spring upward, so that the reel disc and the outer rim of the plate spring come into contact with each other to generate a torque by friction; and a light receiver/emitter sensor for detecting the rotational status of the reel gear, the reel gear having a plurality of sensing holes for allowing light generated by the light receiver/emitter sensor to pass therethrough.

* * * * *